(12) United States Patent
Rangwala et al.

(10) Patent No.: US 9,026,560 B2
(45) Date of Patent: May 5, 2015

(54) DATA CENTER CAPABILITY SUMMARIZATION

(75) Inventors: Sumit Rangwala, Fremont, CA (US); Debojyoti Dutta, Santa Clara, CA (US); Raja Rao Tadimeti, Milpitas, CA (US); Subrata Banerjee, Los Altos, CA (US); Yuanbo Zhu, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 272 days.

(21) Appl. No.: 13/234,264

(22) Filed: Sep. 16, 2011

(65) Prior Publication Data

US 2013/0073552 A1 Mar. 21, 2013

(51) Int. Cl.
*G06F 17/30* (2006.01)
*G06F 1/32* (2006.01)

(52) U.S. Cl.
CPC .... *G06F 17/30489* (2013.01); *G06F 2209/503* (2013.01)

(58) Field of Classification Search
CPC ................................................ G06F 17/30489
See application file for complete search history.

(56) References Cited

U.S. PATENT DOCUMENTS

| | | | |
|---|---|---|---|
| 6,374,251 B1 * | 4/2002 | Fayyad et al. ......................... 1/1 |
| 7,590,653 B2 * | 9/2009 | Sparks .................................... 1/1 |
| 7,685,148 B2 * | 3/2010 | Engquist et al. ............... 709/201 |
| 7,755,786 B2 * | 7/2010 | Foehr et al. ................... 358/1.15 |
| 7,949,569 B2 * | 5/2011 | Maes ............................ 705/26.1 |
| 8,069,269 B2 * | 11/2011 | Todd et al. ......................... 710/5 |
| 8,086,253 B1 * | 12/2011 | Kalamkar et al. ............. 455/466 |
| 2003/0140108 A1 * | 7/2003 | Sampathkumar ............. 709/208 |
| 2003/0195988 A1 * | 10/2003 | Sahuc et al. .................. 709/246 |
| 2004/0006398 A1 * | 1/2004 | Bickford ......................... 700/30 |
| 2004/0073659 A1 * | 4/2004 | Rajsic et al. ................... 709/224 |
| 2005/0022202 A1 * | 1/2005 | Sannapa Reddy et al. ... 718/105 |
| 2006/0053337 A1 * | 3/2006 | Pomaranski et al. ............. 714/4 |
| 2007/0185990 A1 * | 8/2007 | Ono et al. ...................... 709/224 |
| 2007/0226640 A1 * | 9/2007 | Holbrook et al. ............. 715/765 |
| 2007/0239211 A1 * | 10/2007 | Lorincz et al. .................... 607/2 |
| 2007/0298821 A1 * | 12/2007 | Bush ............................. 455/507 |
| 2008/0198757 A1 * | 8/2008 | Dan et al. ....................... 370/252 |
| 2009/0089145 A1 * | 4/2009 | Kent et al. ....................... 705/10 |
| 2009/0092115 A1 * | 4/2009 | Zuniga .......................... 370/338 |
| 2009/0301198 A1 * | 12/2009 | Sohn et al. ...................... 73/598 |
| 2010/0198985 A1 * | 8/2010 | Kanevsky et al. ............. 709/241 |
| 2010/0281214 A1 * | 11/2010 | Jernigan, IV ................. 711/114 |
| 2011/0009995 A1 * | 1/2011 | Attila et al. ................... 700/100 |

(Continued)

OTHER PUBLICATIONS

Bruno et al., "STHoles: A Multidimensional Workload-Aware Histogram", ACM SIGMOD May 2001, 12 pages.

(Continued)

*Primary Examiner* — Tarek Chbouki
(74) *Attorney, Agent, or Firm* — Edell, Shapiro & Finnan, LLC

(57) ABSTRACT

A method for summarizing capabilities in a hierarchically arranged data center includes receiving capabilities information, wherein the capabilities information is representative of capabilities of respective nodes at a first hierarchical level in the hierarchically arranged data center, clustering nodes based on groups of capabilities information, generating a histogram that represents individual node clusters, and sending the histogram to a next higher level in the hierarchically arranged data center. Relative rankings of capabilities may be used to order a sequence of clustering operations.

20 Claims, 18 Drawing Sheets

| CAP-A (Boolean) | CAP-C (Numeric) | CAP-D (Enum) | CAP-E (Numeric) | CAP-G (Numeric) | COUNT |
|---|---|---|---|---|---|
| No | 1000 | TCP,UDP, SNMP | 2,15 | 93k | 3 |

(56) References Cited

U.S. PATENT DOCUMENTS

| | | | |
|---|---|---|---|
| 2011/0055892 A1* | 3/2011 | Wang et al. | 726/3 |
| 2011/0179176 A1* | 7/2011 | Ravichandran et al. | 709/226 |
| 2012/0131090 A1* | 5/2012 | Doddavula | 709/203 |
| 2012/0136971 A1* | 5/2012 | Cherkasova et al. | 709/219 |
| 2012/0226789 A1* | 9/2012 | Ganesan et al. | 709/223 |
| 2012/0226799 A1* | 9/2012 | Kapur et al. | 709/224 |

OTHER PUBLICATIONS

Greenwald et al., "Space-Efficient Online Computation of Quantile Summaries", ACM SIGMOD May 2001, pages 58-66.

Huang, Z., "Extensions to the k-Means Algorithm for Clustering Large Data Sets with Categorical Values", Data Mining Knowledge Discovery 2, pp. 283-304, (1998).

Aboulnaga et al., "Self-tuning Histograms: Building Histograms Without Looking at Data", (1999), 12 pages.

Bruno et al., "STHoles: A Multidimensional Workload-Aware Histogram", ACM SIGMOD (May 2001), 12 pages.

Gunopulos et al., "Approximating multi-dimensional aggregate range queries over real attributes", (2000), pp. 1-25.

Greenwald et al., "Space-Efficient Online Computation of Quantile Summaries", ACM SIGMOD (May 2001), pp. 58-66.

Huang, Z., "Clustering Large Data Sets With Mixed Numeric and Categorical Values", (1997), pp. 1-14.

Vitter et al., "Approximate Computation of Multidimensional Aggregates of Sparse Data Using Wavelets", (1999), 12 pages.

Huang, Z., "A Fast Clustering Algorithm to Cluster Very Large Categorical Data Sets in Data Mining", (1997), 8 pages.

He et al., "Clustering Mixed Numeric and Categorical Data: A Cluster Ensemble Approach", (2002), 14 pages.

Acharya et al., "Join Synopses for Approximate Query Answering", (1999), 12 pages.

Ganti et al., "Cactus-Clustering Categorical Data Using Summaries", (2000), 11 pages.

MacQueen, J., "Some Methods for Classification and Analysis of Multivariate Observations", (1967), pp. 281-297.

Huang, Z., "Extensions to the k-Means Algorithm for Clustering Large Data Sets with Categorical Values", Data Mining and Knowledge Discovery 2, (1998), pp. 283-304.

* cited by examiner

| CAP-A (Enum) | CAP-B (Numeric) | CAP-C (Numeric) | COUNT |
|---|---|---|---|
| HTTPS | 4.5 | 45k | 2 |
| HTTPS | 1.3 | 80k | 3 |
| HTTP | 8.8 | 20k | 1 |
| HTTP | 2.3 | 40k | 2 |

| DEVICE | CAP-A (Enum) | CAP-B (Numeric) | CAP-C (Numeric) |
|---|---|---|---|
| D1 | HTTPS | 4 | 40k |
| D2 | HTTPS | 5 | 50k |
| D3 | HTTPS | 3 | 90k |
| D4 | HTTPS | 1 | 70k |
| D5 | HTTPS | 2.5 | 80k |
| D6 | HTTP | 8 | 20k |
| D7 | HTTP | 2 | 35k |
| D8 | HTTP | 3 | 45k |

FIG. 5

|  | CAP-A (Enum) (Mngm't protocol) | CAP-B (Numeric) (Uplink-BW) | CAP-C (Numeric) (VServer Count) |
|---|---|---|---|
| CLUSTER 1 | HTTPS | 4 | 40k |
| | HTTPS | 5 | 50k |
| CLUSTER 2 | HTTPS | 3 | 90k |
| | HTTPS | 1 | 70k |
| | HTTPS | 2.5 | 80k |
| CLUSTER 3 | HTTP | 8 | 20k |
| CLUSTER 4 | HTTP | 2 | 35k |
| | HTTP | 3 | 45k |

FIG. 6

| RANK=2 | RANK=1 | |
|---|---|---|
| CAP-A (Enum) (Mngm't protocol) | CAP-B (Numeric) (Uplink-BW) | CAP-C (Numeric) (VServer Count) |
| HTTPS | 4 | 40k |
| HTTPS | 5 | 50k |
| HTTPS | 3 | 90k |
| HTTPS | 1 | 70k |
| HTTPS | 2.5 | 80k |
| HTTP | 8 | 20k |
| HTTP | 2 | 35k |
| HTTP | 3 | 45k |

*FIG. 7*

| | CLUSTERS=2<br>RANK=2 | | CLUSTERS=2<br>RANK=1 |
|---|---|---|---|
| CAP-A (Enum)<br>(Mngm't protocol) | CAP-B (Numeric)<br>(Uplink-BW) | CAP-C (Numeric)<br>(VServer Count) |
| HTTPS | 4 | 40k |
| HTTPS | 5 | 50k |
| HTTPS | 3 | 90k |
| HTTPS | 1 | 70k |
| HTTPS | 2.5 | 80k |
| HTTP | 8 | 20k |
| HTTP | 2 | 35k |
| HTTP | 3 | 45k |

FIG. 8A

| CAP-A (Enum) | CAP-B (Numeric) | CAP-C (Numeric) |
|---|---|---|
| HTTPS | 4 | 40k |
| HTTPS | 5 | 50k |
| HTTPS | 3 | 90k |
| HTTPS | 1 | 70k |
| HTTPS | 2.5 | 80k |
| HTTP | 8 | 20k |
| HTTP | 2 | 35k |
| HTTP | 3 | 45k |

CLUSTERS=2

DIVIDE INTO TWO SETS USING ONLY THIS CAPABILITY

CLUSTERS=2

RANK=1

FIG. 8B

| CAP-A (Enum) | CAP-B (Numeric) | CAP-C (Numeric) |
|---|---|---|
| HTTPS | 4 | 40k |
| HTTPS | 5 | 50k |
| HTTPS | 3 | 90k |
| HTTPS | 1 | 70k |
| HTTPS | 2.5 | 80k |
| HTTP | 8 | 20k |
| HTTP | 2 | 35k |
| HTTP | 3 | 45k |

CLUSTERS=2

RANK=2

CLUSTERS=2

*FURTHER* DIVIDE EACH SET INTO *TWO* SUBSETS USING ONLY THESE CAPABILITIES

FIG. 8C

[CLUSTERS=2]          [≤ 4 CLUSTERS]
[RANK=2]              [CLUSTER=2]
                      [RANK=1]

|  | CAP-A (Enum) | CAP-B (Numeric) | CAP-C (Numeric) |
|---|---|---|---|
| CLUSTER 1 | HTTPS | 4 | 40k |
| CLUSTER 1 | HTTPS | 5 | 50k |
| CLUSTER 2 | HTTPS | 3 | 90k |
| CLUSTER 2 | HTTPS | 1 | 70k |
| CLUSTER 2 | HTTPS | 2.5 | 80k |
| CLUSTER 3 | HTTP | 8 | 20k |
| CLUSTER 4 | HTTP | 2 | 35k |
| CLUSTER 4 | HTTP | 3 | 45k |

FIG. 10

| CAP-B (Numeric)<br>(NORM.FACTOR=10) | CAP-C (Numeric)<br>(NORM.FACTOR=100k) |
|---|---|
| 4 (0.4) | 40k (0.4) |
| 5 (0.5) | 50k (0.5) |

$$\begin{aligned} \text{DISTANCE} &= \sqrt{(0.5-0.4)^2 + (0.5-0.4)^2} \\ &= \sqrt{0.01 + 0.01} \\ &= 0.141 \end{aligned}$$

FIG. 11

| CAP-K (Enum) | CAP-L (Enum) | CAP-M (Boolean) | CAP-N (Enum) |
|---|---|---|---|
| Xen | Ethernet | No | TCP |
| Vmware | Ethernet | No | UDP |

HAMMING DISTANCE

| 1 | 0 | 0 | 1 | 2 |
|---|---|---|---|---|

FIG. 12

| CAP-P (Boolean) | CAP-Q (Numeric) | CAP-R (Enum) | CAP-S (Numeric) | CAP-T (Numeric) |
|---|---|---|---|---|
| No | 1000 | UDP | 5 | 50k |
| Yes | 8000 | UDP | 3 | 60k |

| | | | | | HAMMING DISTANCE |
|---|---|---|---|---|---|
| 1 | X | 0 | X | X | 1 |

| | | | | | EUCLIDEAN DISTANCE |
|---|---|---|---|---|---|
| X | 7000/10k | X | 2/10 | 10k/100k | .735 |

| TOTAL DISTANCE | 1.735 |
|---|---|

FIG. 14A

| CAP-A (Boolean) | CAP-C (Numeric) | CAP-D (Enum) | CAP-E (Numeric) | CAP-G (Numeric) | COUNT |
|---|---|---|---|---|---|
| No | 1000 | TCP,UDP,SNMP | 2,15 | 93k | 3 |

FIG. 14B

| OP-VALUE | OP-FREQ | MEANING |
|---|---|---|
| None | None | Complete histogram |
| Union | Ignore | Union |
| Intersection | Ignore | Intersection |
| Max5 | Ignore | Top 5 values |
| None | Max5 | Histogram of 5 most occurring values |

FIG. 15

| CAP-A (Boolean) | CAP-C (Numeric) | CAP-D (Enum) | CAP-E (Numeric) | CAP-G (Numeric) | COUNT |
|---|---|---|---|---|---|
| No | 1000 | TCP,UDP, SNMP | 2.15 | 93k | 3 |

| MAX-FREQ | MIN | UNION | (MIN,MAX) | MEAN |
|---|---|---|---|---|
| Assign-to-all | Assign-to-all | Assign-to-all | Uniformly-distribute | Assign-to-all |

| CAP-A (Boolean) | CAP-C (Numeric) | CAP-D (Enum) | CAP-E (Numeric) | CAP-G (Numeric) |
|---|---|---|---|---|
| No | 1000 | TCP,UDP, SNMP | 2 | 93k |
| No | 1000 | TCP,UDP, SNMP | 8 | 93k |
| No | 1000 | TCP,UDP, SNMP | 15 | 93k |

DATA CENTER CAPABILITY SUMMARIZATION

TECHNICAL FIELD

The present disclosure relates to management of cloud computing infrastructure.

BACKGROUND

"Cloud computing" can be defined as Internet-based computing in which shared resources, software and information are provided to client or user computers or other devices on-demand from a pool of resources that are communicatively available via the Internet, or other electronic network. Cloud computing is envisioned as a way to democratize access to resources and services, letting users efficiently consume as many resources as they need and/or can afford.

In some implementations, cloud computing comprises linking backend resources (e.g., memory, processing power, bandwidth, etc.), i.e., devices and functionality that provide those resources, to provide web-based services, applications, and data storage, among other services. This approach has the potential effect of providing services at lower cost than current options, and with less complexity, greater scalability, and wider reach. However, linking the appropriate mix of backend systems to each other and to client or user devices can be daunting, especially in view of the fact that there may be many thousands of such backend systems or devices, each having different capabilities and attributes.

BRIEF DESCRIPTION OF THE DRAWINGS

FIG. 5 depicts an example of clustering that is performed by the summarization module.

FIGS. 6-8C show clustering operations performed by the summarization module when capabilities rankings are employed.

FIG. 10 shows how numerical capabilities can be normalized by the summarization module.

FIG. 11 shows an example of calculating a hamming distance for non-numeric capabilities by the summarization module.

FIG. 12 shows an example summarization of numeric and non-numeric capabilities by the summarization module.

FIGS. 14 and 15 depict cluster interpretation that may be performed by a summarization module.

DESCRIPTION OF EXAMPLE EMBODIMENTS

Overview

In one embodiment a method includes summarizing capabilities in a hierarchically arranged data center by receiving capabilities information, wherein the capabilities information is representative of capabilities of respective nodes at a first hierarchical level in the hierarchically arranged data center, clustering nodes into clusters based on the capabilities information, generating a histogram that represents individual capabilities clusters, and sending the histogram to a next higher level in the hierarchically arranged data center. Relative rankings of capabilities may be used to augment, e.g., sequence, clustering operations.

Example Embodiments

Figure 1:
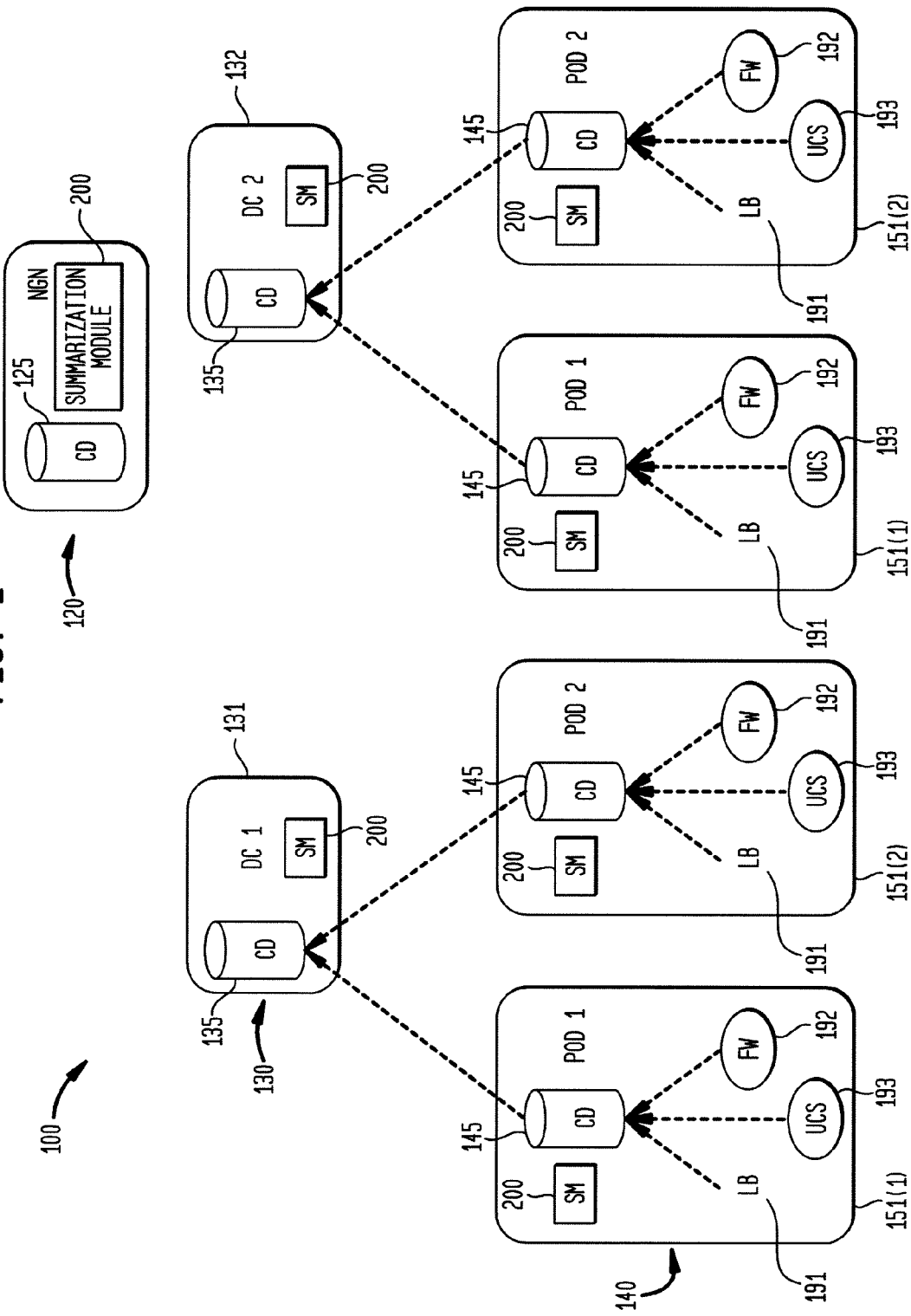
FIG. 1 depicts a schematic diagram of a network topology that supports cloud computing and that includes a summarization module deployed within different domains and hierarchical levels of the network.

FIG. 1 depicts a schematic diagram of a network topology that supports cloud computing and that include summarization modules that are deployed within different domains and hierarchical levels of the network. Specifically, FIG. 1 shows a network topology 100 that supports a cloud computing network (CCN), sometimes referred to herein as a next generation network (NGN). Several hierarchical network levels are shown, although those skilled in the art will appreciate that the specific topology shown is only an example, and more or fewer hierarchical layers may be employed. As shown, there is a top level network layer 120, a data center layer 130 and a POD level layer 140.

The top level network 120 interconnects a plurality of routers (not shown). Some of the routers may be provider edge routers that enable connectivity to data centers 131, 132 via data center edge routers (not shown). Other routers may be employed exclusively internally to the top level network 120 as "core" routers, in that they may not have direct visibility to any data center edge router. Top level network 120 also includes a capabilities database (CD) 125 that may operate in conjunction with a summarization module 200, discussed more fully below.

Data centers 131, 132 in layer 130 (and using data center 131 as an example) may comprise data center edge routers (as mentioned), one or more firewalls (not shown), and one or more load balancers (not shown). Those skilled in the art will appreciate that other device types may also be included in layer 130, as well as the other network layers described herein. Data center 131 also includes a capabilities database 135 and summarization module 200.

POD layer 140 elements include individual PODs 151(1)-151(2), 152(1), 152(2), etc., which respectively include multiple cloud resource devices including, e.g., a load balancer 191, firewall 192 and a unified computing server (UCS) 193. A UCS 193 may be a computing server, a database server, an application server, or any other electronic data processing device that can be used to offer cloud computing services to users. In a practical implementation, a given POD 151 or 152 will deploy a plurality of UCSs 193. Like the other layers 120, 130, PODs 151(1), 151(2), etc. in layer 140 also include a capabilities database 145 and summarization module 200.

A function of the capabilities databases 125, 135, 145 (within the respective domains in the CCN topology) is to collect capability information from devices (e.g., load balancers 191, firewalls 192 and UCS devices 193) and maintain a repository (database) of these capabilities. As shown, and in one possible implementation, a capabilities database is deployed in every CCN domain, i.e., POD 151(1), 151(2), etc., data center 132, 132, and NGN layer 120, as part of the respective control point (i.e., a point at which the domain communicates with a next higher level of the hierarchy). In the POD domain, capabilities database 145 receives capability information directly from, e.g., a policy agent resident on respective devices 191, 192, 193 in the POD. The data center domain capabilities database 135, however, receives capability information about the devices in the data center indirectly from the POD capability databases 145, via e.g., a summarization module 200. In addition, the data center capabilities database may also receive information from policy agents of network elements in the data center that are not part of any POD. Similarly, NGN capabilities database 125 can receive information about all the devices in the data center from data center capabilities databases 135, and/or via associated summarization modules 200.

Assuming a manageable number of devices 191, 192, 193 in a POD, scalability may not be a concern at the POD capabilities database 145. Therefore, the data received from the devices by a POD capabilities database 145 can be stored as is. However, if all the PODs in a data center were to advertise all the capability information that they have, as is, to a data center capabilities database 135, scalability both in terms of space required to store the capability information and the amount of computation that might be needed to process it at the data center capabilities database 135 can become excessive. Similar scalability issues can exist for capability data advertised from data center capabilities databases 135 to the NGN capabilities database 125.

Figure 2:
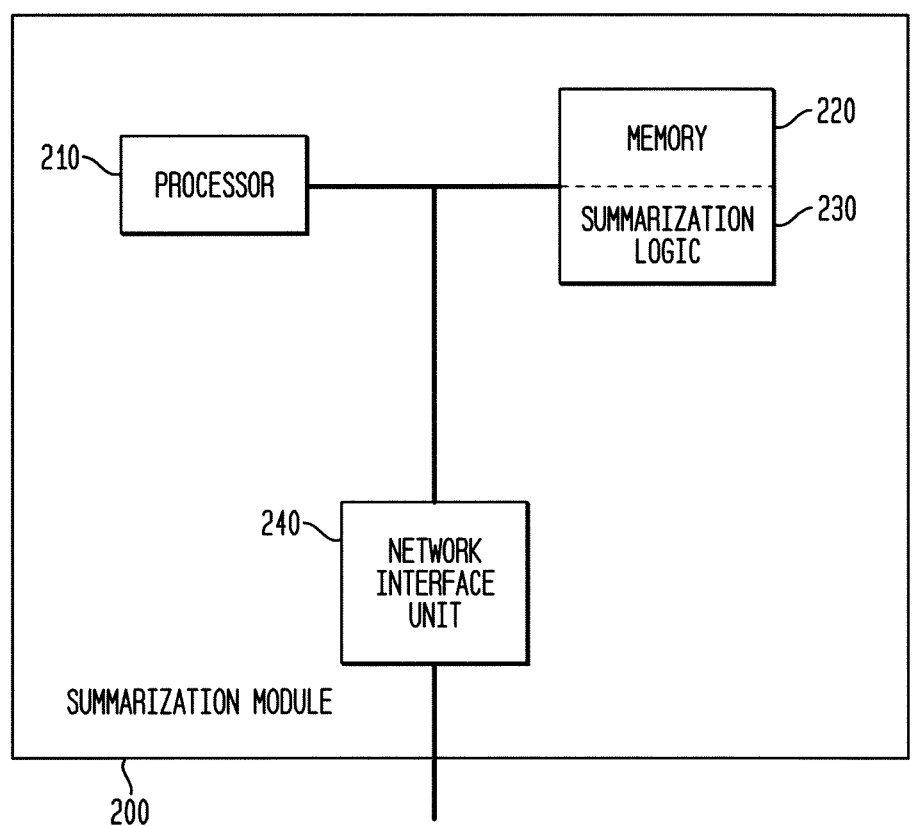
FIG. 2 depicts a summarization module that includes capabilities summarization logic.

In order to address this potential scalability issue, domains are configured to advertise summarized capabilities data to the upper level domains, resulting in a more compact view of the capabilities of the devices or nodes in lower levels of the hierarchy. Thus, as shown in FIG. 1, POD capabilities databases 145, using summarization modules 200, summarize data before advertising it to a data center capabilities database 135, and upwards still to an NGN capabilities database 125. Described below is the architecture and functionality of an example summarization module 200. Reference is first made to FIG. 2, which depicts an example summarization module 200.

As shown in FIG. 2, summarization module 200 comprises a processor 210, associated memory 220, which may include summarization logic 230 stored in the memory 220, and a network interface unit 240 such as a network interface card, which enables the summarization module 200 to communicate externally with other devices, e.g., a capabilities database. Although not shown, each summarization module 200 may be accessible directly or via a network using, e.g., input/output devices such as a keyboard, mouse and display to enable control of a given summarization module 200.

Processors 210 may be a programmable processor (microprocessor or microcontroller) or fixed-logic processors. In the case of a programmable processor, any associated memory (e.g., 220) may be of any type of tangible processor readable memory (e.g., random access, read-only, etc.) that is encoded with or stores instructions that can implement the summarization logic 230. Alternatively, processor 210 may be comprised of a fixed-logic processing device, such as an application specific integrated circuit (ASIC) or digital signal processor that is configured with firmware comprised of instructions or logic that cause the processor to perform the functions described herein. Thus, summarization logic 230 may be encoded in one or more tangible media for execution, such as with fixed logic or programmable logic (e.g., software/computer instructions executed by a processor) and any processor may be a programmable processor, programmable digital logic (e.g., field programmable gate array) or an ASIC that comprises fixed digital logic, or a combination thereof. In general, any process logic may be embodied in a processor or computer readable medium that is encoded with instructions for execution by a processor that, when executed by the processor, are operable to cause the processor to perform the functions described herein.

A function of the summarization module 200 is to the reduce the amount of data (e.g., the number of bytes) that is advertised by a domain's capabilities database to a higher level domain's capabilities database while minimizing the amount of error introduced due to summarization. In accordance with an embodiment, summarization module 200, as will be described in detail below, is configured to be sensitive to the relative importance of different attributes or capabilities, and to operate on both enumerated (i.e., non-numeric) and numeric data types.

Figure 3:
FIG. 3 depicts an example capabilities summarization generated by the summarization module.

FIG. 3 depicts an example summarization result generated by summarization module 200. A set of devices D1, D2, etc. (of the same device class, e.g., load balancers 191) advertise capabilities, as shown in the table at the bottom of the figure, to, e.g., a POD capabilities database 145. The summarization module 200 is configured to summarize these capabilities into a table like that shown at the top of the figure before re-advertising the capabilities to the data center capabilities database 135. In this way, the information that is transmitted from the POD capabilities database 145 to the data center capabilities database 135 can be reduced, and the processing performed at the data center capabilities database can be reduced. As is seen in FIG. 3, count value is associated with the summarized capabilities to represent how many of each category of device is available.

Figure 4:
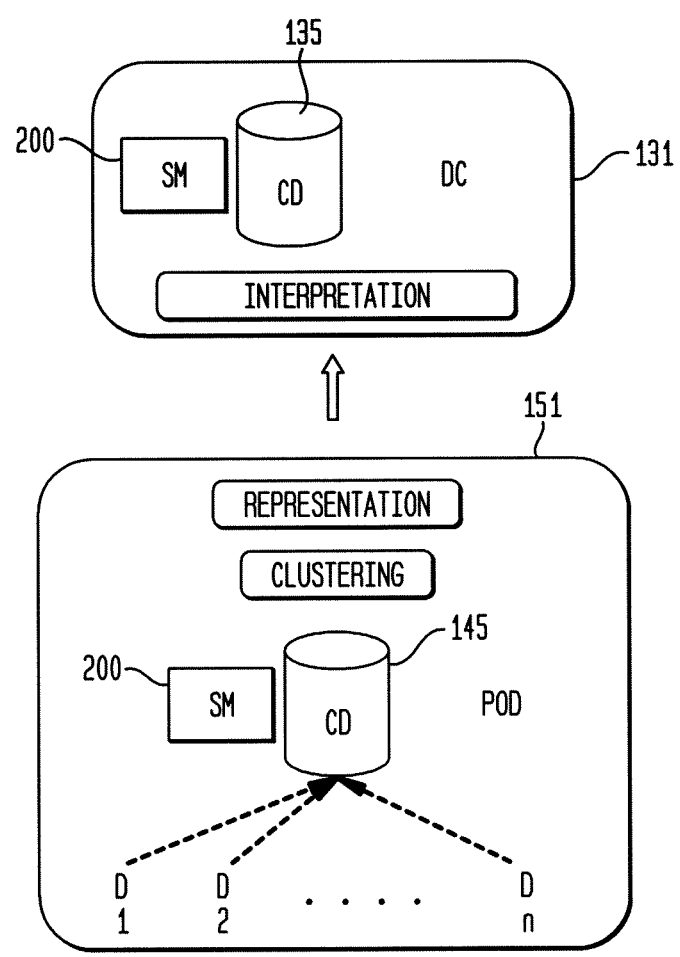
FIG. 4 schematically depicts a plurality of operations performed in connection with capabilities summarization.

FIG. 4 depicts a plurality of operations performed in connection with capabilities summarization. In accordance with one possible implementation, summarization module 200 is configured to perform the following operations:

Clustering (grouping), including ranking;
Cluster Representation (summarizing), using, e.g., histograms; and
Cluster Interpretation (interpreting).

The clustering and cluster representation operations are performed, in conjunction with a summarization module 200, at a domain's capabilities database before capabilities are re-advertised to a next higher level, while cluster interpretation occurs at an upper level domain after reception of an advertisement of summarized capabilities from a lower level capabilities database or summarization module.

Clustering

Clustering involves dividing a single set of data points into k mutually exclusive sets. For example, the table in FIG. 5 shows a table (single data set) comprising eight entries (data points) each representing a single device. The table shows clustering of rows of the table into four individual groups, Cluster 1, Cluster 2, Cluster 3 and Cluster 4.

In the context of a CCN or NGN architecture, for a given device class (e.g., load balancer 191, firewall 192, or virtual machine instantiated on a UCS 193) a capabilities database, in conjunction with summarization module 200, receives the capabilities described by the devices of that class and creates some number of groups (clusters), as shown in FIG. 5. Each group is then represented by a single representative device whose capabilities are derived from the capabilities of all the devices in that group. The summarization module 200 sends or advertises these k representative devices (rows), each of which represents all the devices in that group. The number of clusters, k, created during the clustering process, therefore, represents the data reduction obtained during the summarization process.

Summarization module 200 is configured with inputs that enable it to group capabilities in a manner that satisfies two goals: losing the least amount of information in the process of summarization and achieving the desired level of data reduction.

Inputs employed for clustering can be grouped into two categories:

(a) Relative importance of each capability (i.e., ranking); and (b) The number of clusters (and hence the degree of data reduction to be created during clustering).

Relative Importance of Each Capability

The capabilities of devices might not all be of equal importance. Taking a load balancer as an example, the number of virtual machines or servers (vservers) that is currently available for provisioning might be of greater importance than the management protocol that is supported by the load balancer. In this regard, the summarization module 200 can use a ranking of capabilities, specified by, e.g., a user (such as a service provider), to obtain the relative importance of the capabilities. For example, as shown in FIG. 6, capability "vservers count" (CAP-C) and capability uplink bandwidth (CAP-B) are given a rank 1, i.e., greater importance, than capability "management protocol" (CAP-A) which is given a rank 2 for relatively lower importance. This information about relative importance can be used during clustering operations to ensure that elements in a group differ less in their more important capabilities compared to the less important capabilities.

The Number of Clusters

Another input employed by the summarization module 200 is the number of clusters to be defined. That is, it is possible to specify the number of clusters to be created for each capability group. In one possible embodiment, a service provider can be given the ability to define or control the amount of data reduction desired with summarization by specifying the a value, k, for the number of desired clusters per group of capabilities. For example, as shown in FIG. 7, both rank 1 and rank 2 capabilities are specified to have two clusters.

Those skilled in the art will appreciate that the data sets in a CCN environment will be significantly larger than the example table shown in, e.g., FIG. 7. Nevertheless, the same summarization approach described herein is equally applicable to larger data sets and higher numbers of cluster, k, and an increased number of rankings.

Reference is now made to FIGS. 8A-8C which show clustering operations performed by the summarization module 200 when capabilities rankings are employed (given a predetermined number of clusters, in this case 2). Specifically, the complete data set is first clustered using only the lowest ranked capabilities into the specified number of cluster for that rank (FIG. 8A). The subsequent clusters are then further divided into specified number of sub-clusters using the next higher rank capability (FIG. 8B). That is, the capabilities on the right side of the figure (having a rank=1) are then each subdivided into two clusters. This general process is continued until all the capability ranks are exhausted. FIG. 8C depicts the four separate clusters that result from the foregoing clustering operations.

The rankings, capability groups, and the number of clusters per capability can be specified by a service provider in terms of a resource policy. Such a resource policy may be defined using an eXtensible Markup Language (XML) file. Thus, in a CCN architecture, the summarization module 200 could receive these summarization-options from a policy manager module that is accessible to the service provider.

Since each cluster is represented by a single representative device, some loss of information is inevitable due to summarization. This loss of information can be kept to a minimum if the devices that are grouped together in a single group have similar capabilities. In other words, the value of respective capabilities of devices in a group should, to the extent possible, be close to each other. One approach to obtain this "closeness" is referred to as "k-means" clustering, described below. It has been determined that k-means clustering may be particularly suitable for processing node capabilities in a data center context. However, it is noted that k-means clustering may not work for all capability types (e.g., enumerated (non-numerical) data types) that are currently employed in CCN implementations. Therefore, an extension of k-means clustering for such data types is also described below.

K-Means Clustering

Figure 9:
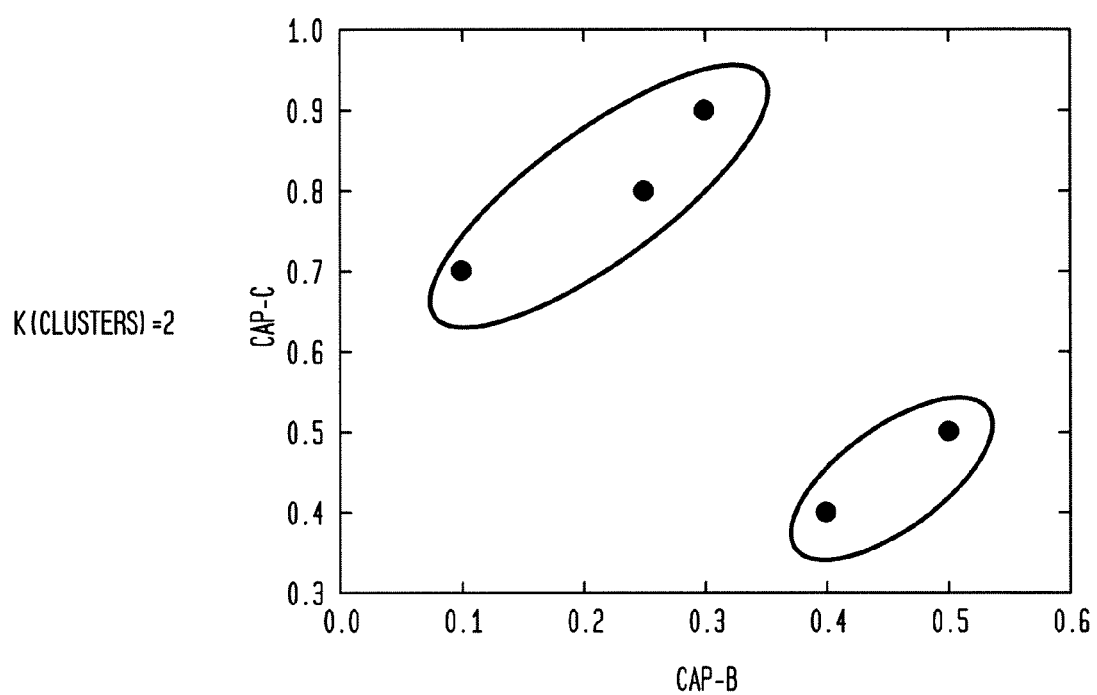
FIG. 9 shows data points and clusters identified by a k-means operation for k=2 that can be used by the summarization module.

K-means clustering divides a set of points (e.g., devices with given capabilities) into k clusters such that each point belonging to a cluster is closer to the centroid of that cluster than the centroid of any other cluster. FIG. 9 shows example data points (devices) and the clusters returned by k-means clustering for k=2. Of course, FIG. 9 depicts only two capabilities (CAP-B and CAP-C). Those skilled in the art will appreciate that k-means clustering can also operate on more than two dimensions.

More specifically, given m points, where each point has n-dimensions and k is the number of clusters desired, a k-means clustering operation includes the following operations:

Select k initial point from the data set
  They are initial centroids of the k cluster and form the initial k clusters
Iterate:
  Assign every point to the cluster whose centroid is closest to the point
  Find a new centroid of every cluster from the points in the cluster $x_{centroid} = \Sigma\ x_i/c$, $y_{centroid} = \Sigma\ x_i/c$; c=number of points in the respective cluster
Stop when no membership change occurs.

As mentioned, in the CCN context, points are devices and the n-dimensions are the n capabilities of each device. In a CCN environment, to reduce the computation cost of the above operations two modifications can be implemented, namely intelligent selection of initial k points, wherein the first k points can be selected to be mutually furthest from each other, and iterating for only g cycles, wherein operations can be stopped after running for g cycles. The value g can be tuned appropriately based on the optimal clustering versus computation cost tradeoff.

The k-means clustering approach described herein employs a measure of distance between two points. The following discusses implication of the k-means clustering operation for numeric data types and non-numeric data types.

Numeric Data Types

Distance between two points described solely by capabilities that are numeric can be calculated using the Euclidean distance i.e., $\sqrt{[(x1-x2)^2+(y1-y2)^2]}$. However, this distance cannot be measured using the absolute value of the numeric capabilities since the range of two values can be vastly different. Further, calculating distance on absolute value can lead to the capability with a larger range dominate the distance measure. Therefore, in accordance with one possible embodiment, numeric capabilities can be normalized before the distance is measure calculated, as shown in FIG. 10. However, normalization also has the added effect of giving relative weights to the capability. If all capabilities are normalized by their full range, each is implicitly assigned equal weight.

Non-Numeric Types

Applying k-means operations to data types that are non-numeric involves assigning a measure of distance to these data types which cannot easily be done by assigning a numeric value to each non-numeric value. For example, consider a capability of "Management Protocol" which has the possible values of "HTTP", "HTTPS", and "TCP". All these values (i.e., HTTP, HTTPS, and TCP) are equidistant from each other and thus there is no way of assigning a numeric value to these "enum" types that would give an equal Euclidean distance measure between them. Therefore, a "hamming distance," as described below, can be used to measure distance between non-numeric data types.

A "hamming distance" is the measure of dissimilarity between the values that are of non-numeric type. A hamming distance between two data points is the count of number of values that are dissimilar among those two points, i.e., every dissimilar value contributes a distance of 1 while similar values contribute a distance of 0 to the total distance count. For example, in FIG. 11 the two data points differ in their values for CAP-K and CAP-N, each contributing 1 to the total distance measure while their values of CAP-L and CAP-M being similar does not contribute to the total distance.

For points that have some dimensions that are numeric and others that are non-numeric, a single value of distance can be obtained by combining the Euclidean distance obtained for numeric data types and the hamming distance obtained for non-numeric data types. As shown in FIG. 12, the Euclidean distance between the two data points is calculated ignoring the non-numeric data types and the hamming distance is calculated independently ignoring the numeric data types. The total distance is then calculated as the sum of the Euclidean and hamming distances.

K-Means Operations for Mixed Data Types

With the distance measure defined for each data type, k-means clustering can be used to cluster data points consisting of mixed data types. However, a centroid cannot be calculated with non-numeric data types. Thus, in one possible implementation, the "mode" (i.e., the non-numeric data value that occurs the most number of times in a single cluster) of a capability can be used as the value for the centroid.

Cluster Representation

Figure 13:
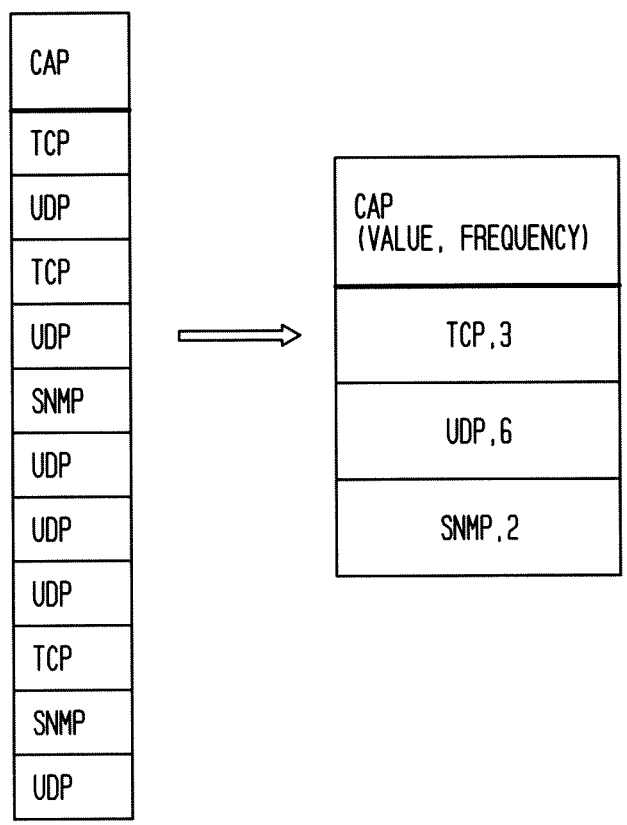
FIG. 13 shows an example of histogram representation of clusters by the summarization module.

Once clusters have been created, each cluster is represented by a "count" of devices in the cluster and a value representative of the capability or capabilities of the device. In one implementation, cluster representation can be generalized using histograms. That is, for devices in a cluster, a histogram can be calculated for, potentially, every single capability. Summarization operations can then be specified individually for, e.g., "value" and "frequency" to get many possible combinations as shown in FIG. 14B and an example of which is shown in FIG. 13. Such histograms are then advertised to a next higher level in the CCN architecture, whereupon they are interpreted by the summarization module 200 at that level.

More specifically, once clusters have been created, each cluster may be represented by a "count" of devices in the cluster and a value representative of the capability or capabilities of the device. In accordance with one possible implementation, cluster representation can be made using selected functions, e.g., (max, min), max n values, min n values. These different functions can be further generalized by taking a histogram of the capability values. That is, for devices in a cluster, a histogram can be calculated for every single capability. Summarization operations can then be specified individually for, e.g., "value" and "frequency" to obtain many possible combinations, examples of which are shown in FIG. 14B. These histograms have the desired characteristics of reduction in the amount of data required to represent a cluster while incurring relatively less loss in information that has been summarized. As noted, the histograms are then advertised to a next higher level in the CCN architecture, whereupon they are interpreted by the summarization module 200 at that level.

Cluster Interpretation

Summarized data advertised from a POD capabilities database 145 to the data center capabilities database 135 might have a different form compared to the data that is advertised by the individual devices in the PODs. That is, each "device" in the summarized data represents a group of devices (a cluster) and the capabilities, therefore, might be a collection of values rather than a single value. For example, the summarization value of the management protocol of a device shown in FIG. 13 is a pair of values (value, frequency). Because the summarized values are pairs (or even n-tuples in the general case), there are several issues that may need to be addressed in connection with cluster interpretation, including answering questions about summarized data, re-clustering summarized data for the next level capabilities database, and cluster representation for capabilities that are tuples. Each topic is taken in turn below.

For capabilities that are summarized as a single value it can be assumed that all the devices in the group had the same value for the given capability. However, for capabilities that are summarized as a pair it is not clear how they are to be interpreted for query resolution. For example, when uplink-bandwidth is summarized with (minimum-value, maximum-value) as (2,8) and a "count" field for this summarized cluster is count=10, a question arises as to how this value should be interpreted for a query requesting, e.g., the number of devices with uplink-bandwidth >4.

Summarization also introduces a new kind of data type, an n-tuple, in addition to numeric and non-numeric data discussed above, and as described above, clustering operations can employ the notion of distance (using, e.g., k-means operations) to properly group like or similar capabilities. Measuring distance between two tuples is thus also addressed, as described below.

Finally, in addition to a distance measure, it may also be desirable to find a way to obtain a single tuple from multiple tuples to find a representative value.

The above issues can be addressed by expanding given summarized data into individual devices, i.e., a cluster represented by a representative device and a count value (e.g., 100) can be expanded into, e.g., 100 devices (based on the count value) where the capabilities of each individual device is derived from the capability of the representative device. For example, FIG. 14A shows a cluster of 3 devices (Count=3) represented by a single representative device. FIG. 14B shows operations that may be employed to summarize capabilities. For instance, capability D (CAP-D) in FIG. 14A is summarized using a union operation. CAP-E is summarized using a (min, max) operation. Other operations, as indicated in FIG. 14B, as well as other operations may be employed.

Reference is now made FIG. 15, which shows how the cluster of FIG. 14A can be expanded into three devices, each with its own capabilities. In this figure, the values of CAP-A, CAP-C, CAP-D, and CAP-G of the representative device (as was shown in FIG. 13) are given to every device while, for CAP-E, devices are uniformly assigned a value between the minimum and the maximum value, as present in the representative device (i.e., uniformly distributed between 2 and 15, both inclusive). In this way, summarized data can be interpreted as well as re-summarized for subsequent advertisement to a next higher level. Of course, operations other than the ones shown in FIG. 15 can be employed.

Figure 16:
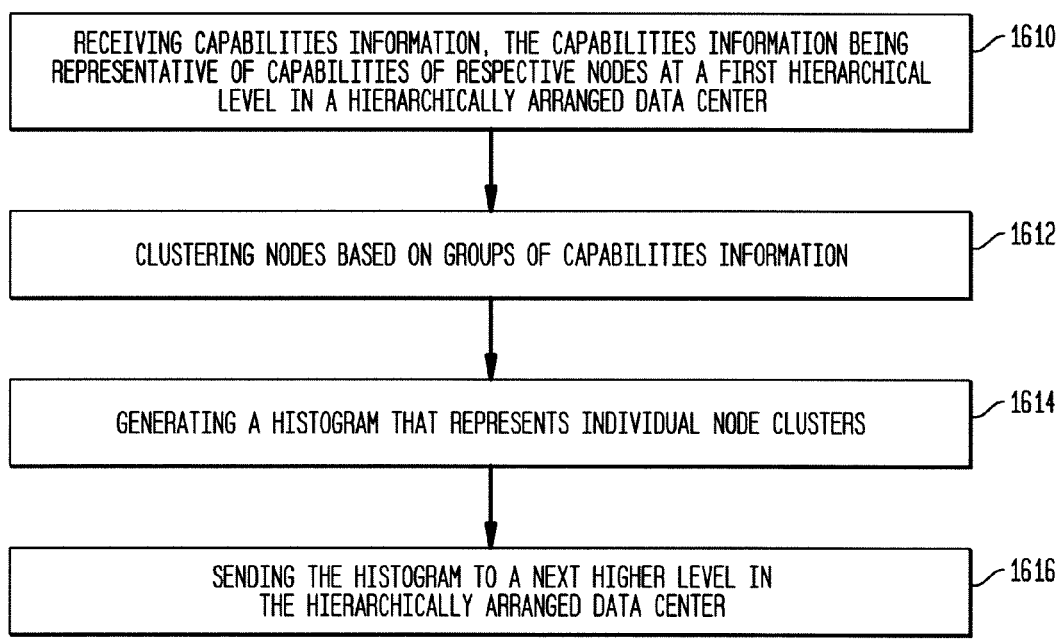
FIG. 16 is a flowchart illustrating example operations that maybe performed by the summarization module.

FIG. 16 shows example operations that maybe performed by the summarization module 200 to effect summarization according to the techniques described herein. At 1610 operations include receiving capabilities information, wherein the capabilities information is representative of capabilities of respective nodes at a first hierarchical level in a hierarchically arranged data center. As mentioned previously, a node may be a single device (or software function operating on a given device) such as load balancer 191, a firewall 192, a unified computing server 193 or collection of these "devices" as represented in summarized form at a data center capabilities database 135. The capabilities information may include attributes of individual ones of these devices or functions including protocol, processing speed, uplink/downlink bandwidth, version of software, etc. The information may be received at a capabilities database that operates in conjunction with a summarization module as shown in, e.g., FIG. 1. The information may be supplied in-band or out of band (e.g., via a separate control channel), as may be appropriate. Each of the nodes is addressable and accessible via an electronic network. Alternatively, the information may be supplied via a publish-subscribe regime deployed in the network hierarchy. In such a publish-subscribe regime, nodes can advertise their summarized capabilities data and next higher level nodes can subscribe to the advertised information.

At 1612, the operations include clustering nodes based on groups of capability information. As explained above, clustering is performed in an effort to reduce the amount of data that is to be sent or advertised to higher levels in the data center hierarchy. Because the capabilities information may include both numeric and non-numeric attributes, clustering in connection with these operations is configured to cluster numeric capabilities and non-numeric capabilities. Non-numeric capabilities may be clustered using a hamming distance. A numeric value resulting from a hamming distance calculation may then be added to a numeric value of a numeric capability to obtain single value that represents all (or a subset of all) capabilities of a given device.

In addition to handling both numeric and non-numeric values, clustering may be further enhanced to take into account relative rankings of capabilities. In accordance with one implementation, clustering is first performed with respect to lower ranking capabilities and secondarily higher ranking capabilities. This approach can help ensure that less error is incurred for more important capabilities during clustering operations.

Further, the rankings and how many clusters (the value k, described above) may be custom defined by a user.

At 1614, operations include generating a histogram that represents individual capabilities clusters. A histogram may be employed in connection with summarization since a histogram permits rich information to be passed to a higher level of the hierarchy, yet still enable a substantial decrease in the amount of information that is advertised to the next higher level.

Finally, at 1616 operations include sending the histogram to a next higher level in the hierarchically arranged data center.

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. A method comprising:
   receiving, via an electronic network, at a capabilities database, capabilities information, the capabilities information being representative of capabilities of respective nodes at a first hierarchical level in a hierarchically arranged data center, the respective nodes comprising a plurality of devices;
   summarizing the capabilities information to cluster the nodes based on groups of capabilities information, resulting in node clusters, wherein each node cluster is represented by a pair of values including a first value and a second value, and a count of devices in the cluster represented by the pair of values, wherein the first value is representative of a given capability and the second value is representative of a frequency of the given capability;
   generating a histogram that represents individual node clusters; and
   sending, via the electronic network, the histogram to a next higher level in the hierarchically arranged data center.

2. The method of claim 1, wherein the capabilities information comprises attributes of the capabilities and wherein clustering comprises clustering based on a relative ranking of the attributes.

3. The method of claim 2, further comprising clustering based on a capability having a first ranking, and then clustering based on a capability have a second ranking higher than the first ranking.

4. The method of claim 1, wherein the nodes are single devices, including at least one of a load balancer, firewall or computing device.

5. The method of claim 1, wherein the nodes comprise a plurality of collections of devices, including at least load balancers, firewalls or computing devices.

6. The method of claim 1, wherein the capabilities information comprises numeric data, and clustering is performed based the numeric data.

7. The method of claim 1, wherein the capabilities information comprises non-numeric data, and clustering further comprises determining a hamming distance based on the non-numeric data and clustering also comprises clustering based on the hamming distance.

8. The method of claim 1, wherein clustering comprises clustering nodes based on capabilities represented by numeric data and capabilities represented by non-numeric data.

9. The method of claim 1, further comprising enabling a user to control at least one of a value that represents the number of clusters to be formed or relative rankings of capabilities in the capabilities information.

10. The method of claim 1, further comprising clustering by using k-means, including clustering a given node in a first cluster when the given node is deemed to be closer to a centroid of the first node than to a centroid of a second cluster.

11. An apparatus, comprising:
   a processor;
   a memory in communication with the processor; and
   a network interface unit in communication with the processor and memory,
   wherein the processor is configured, along with logic instructions stored in the memory, to:
   receive, via the network interface, capabilities information, the capabilities information being representative of capabilities of respective nodes at a first hierarchical level in a hierarchically arranged data center, the respective nodes comprising a plurality of devices;

summarize the capabilities information to cluster the nodes based on groups of capabilities information, resulting in node clusters, wherein each node cluster is represented by a pair of values including a first value and a second value, and a count of devices in the cluster represented by the pair of values, wherein the first value is representative of a given capability and the second value is representative of a frequency of the given capability;

generate a histogram that represents individual node clusters; and send, via network interface, the histogram to a next higher level in the hierarchically arranged data center.

12. The apparatus of claim 11, wherein the capabilities information comprises attributes of the capabilities and the processor is further configured to cluster based on a relative ranking of the attributes.

13. The apparatus of claim 12, wherein the processor is further configured to cluster based on a capability having a first ranking, and then cluster based on a capability have a second ranking higher than the first ranking.

14. The apparatus of claim 11, wherein the processor is configured to cluster nodes based on capabilities information received from single devices, including at least one of a load balancer, firewall or computing device.

15. The apparatus of claim 11, wherein the processor is configured to cluster nodes based on capabilities information received from collections of devices, including at least load balancers, firewalls or computing devices.

16. The apparatus of claim 11, wherein the capabilities information comprises capabilities represented by non-numeric data, and the processor is further configured to determine a hamming distance among the capabilities represented by non-numeric data and to cluster based on the hamming distance.

17. A computer-readable memory medium storing instructions that, when executed by a processor, cause the processor to:

receive capabilities information, the capabilities information being representative of capabilities of respective nodes at a first hierarchical level in a hierarchically arranged data center, the respective nodes comprising a plurality of devices;

summarize the capabilities information to cluster, into node clusters, groups of nodes based on the capabilities information, wherein each node cluster is represented by a pair of values including a first value and a second value, and a count of devices in the cluster represented by the pair of values, wherein the first value is representative of a given capability and the second value is representative of a frequency of the given capability;

generate a histogram that represents individual node clusters; and send the histogram to a next higher level in the hierarchically arranged data center.

18. The computer-readable memory medium of claim 17, wherein the capabilities information comprises attributes of the capabilities, and wherein the instructions that cause the processor to cluster groups of nodes cause the processor to cluster based on a relative ranking of the attributes.

19. The computer-readable memory medium of claim 18, wherein the instructions that cause the processor to cluster groups of nodes cause the processor to cluster based on a capability having a first ranking, and then to cluster based on a capability having a second ranking higher than the first ranking.

20. The computer-readable memory medium of claim 17, wherein the capabilities information comprises non-numeric data, and wherein the instructions that cause the processor to cluster groups of nodes cause the processor to determine a hamming distance among the capabilities and to cluster based on the hamming distance.

* * * * *